(12) United States Patent
Nameki

(10) Patent No.: US 9,079,481 B2
(45) Date of Patent: Jul. 14, 2015

(54) GLASS RUN

(75) Inventor: Nobuyuki Nameki, Sanmu (JP)

(73) Assignee: KINUGAWA RUBBER IND. CO., LTD., Chiba-shi (JP)

( * ) Notice: Subject to any disclaimer, the term of this patent is extended or adjusted under 35 U.S.C. 154(b) by 0 days.

(21) Appl. No.: 13/298,542

(22) Filed: Nov. 17, 2011

(65) Prior Publication Data

US 2012/0124779 A1  May 24, 2012

(30) Foreign Application Priority Data

Nov. 18, 2010  (JP) ................. 2010-258105

(51) Int. Cl.
*E06B 7/16* (2006.01)
*B60J 10/00* (2006.01)
*B60J 10/04* (2006.01)

(52) U.S. Cl.
CPC ............ *B60J 10/0017* (2013.01); *B60J 10/042* (2013.01)

(58) Field of Classification Search
CPC ... B60J 10/042; B60J 10/0017; B60J 10/0022
USPC .................. 49/440, 441, 475.1, 479.1, 495.1
See application file for complete search history.

(56) References Cited

U.S. PATENT DOCUMENTS

| | | | |
|---|---|---|---|
| 2,778,011 A | 1/1957 | Frank | |
| 4,894,954 A * | 1/1990 | Nozaki et al. | 49/479.1 |
| 4,910,918 A * | 3/1990 | Naples et al. | 49/441 |
| 4,969,294 A * | 11/1990 | Guillon et al. | 49/495.1 |
| 5,127,193 A * | 7/1992 | Okada et al. | 49/495.1 |
| 5,195,273 A * | 3/1993 | Yamano et al. | 49/441 |
| 6,520,571 B2 * | 2/2003 | Stemmer et al. | 296/216.06 |
| 6,783,171 B2 * | 8/2004 | Teishi et al. | 296/146.9 |
| 6,996,936 B1 * | 2/2006 | Maass | 49/479.1 |
| 7,533,495 B2 * | 5/2009 | Teramoto et al. | 49/441 |
| 7,762,614 B2 * | 7/2010 | Kubo et al. | 296/146.2 |
| 8,001,728 B2 * | 8/2011 | Shibata et al. | 49/489.1 |
| 2005/0053761 A1 * | 3/2005 | Murase et al. | 428/122 |
| 2006/0107601 A1 * | 5/2006 | Inagaki et al. | 49/441 |

FOREIGN PATENT DOCUMENTS

| | | |
|---|---|---|
| JP | 35-3671 | 4/1960 |
| JP | 60-150121 U | 10/1985 |
| JP | 2000-103242 A | 4/2000 |
| JP | 2000-225848 A | 8/2000 |

(Continued)

OTHER PUBLICATIONS

Japanese Office Action dated Aug. 12, 2014, 6 pgs.

*Primary Examiner* — Katherine Mitchell
*Assistant Examiner* — Scott Denion
(74) *Attorney, Agent, or Firm* — Foley & Lardner LLP

(57) ABSTRACT

A glass run includes a glass run upper side part which is provided with a core member inside, and formed with a longitudinal recess at a longitudinal end portion, wherein the core member extends longitudinally of the glass run upper side part. A glass run corner part joins a glass run lateral side part to the longitudinal end portion of the glass run upper side part, and includes an extension filling the longitudinal recess of the glass run upper side part. A stopper part is fixed to at least one of the glass run upper side part and the glass run corner part, and configured to engage with an automotive door sash. The stopper part overlaps with the core member and the extension of the glass run corner part longitudinally of the glass run upper side part.

7 Claims, 12 Drawing Sheets

(56) References Cited

FOREIGN PATENT DOCUMENTS

| JP | 2002-187434 A | 7/2002 |
| JP | 2006-150993 A | 6/2006 |
| JP | 2007-196909 A | 8/2007 |

* cited by examiner

GLASS RUN

BACKGROUND OF THE INVENTION

The present invention relates generally to a glass run attached to an inside periphery of an automotive door sash.

A typical glass run is formed by forming a glass run upper side part and front and rear glass run lateral side parts individually by extrusion, and then forming front and rear glass run corner parts by molding to join the glass run upper side part and front and rear glass run lateral side parts together.

In general, displacement of a glass run with respect to an automotive door sash in a vehicle longitudinal direction adversely affects surroundings around the automotive door sash in terms of appearance. Such displacement of a glass run may result from stresses due to up-and-down slide of a door glass, or from expansion or shrinkage of a glass run upper side part of the glass run due to temperature change, aging, etc.

Japanese Patent Application Publication No. 2006-150993 discloses a glass run which includes a glass run upper side part provided with a core member inside, such as a wire made of metal or a cord made of synthetic resin. This construction is intended for preventing the glass run upper side part from expanding or shrinking in a vehicle longitudinal direction.

Japanese Patent Application Publication No. 2007-196909 discloses a glass run which includes a glass run corner part provided with a positioning projection adapted to engage with a hole of an automotive door sash to which the glass run is attached. This construction is intended for preventing displacement of the glass run in a vehicle longitudinal direction.

SUMMARY OF THE INVENTION

If the concept disclosed by Japanese Patent Application Publication No. 2006-150993 and the concept disclosed by Japanese Patent Application Publication No. 2007-196909 are combined, the glass run upper side part may be prevented from expanding or shrinking in the vehicle longitudinal direction because of the provision of the core member, and the glass run corner part may be prevented from being displaced with respect to the automotive door sash because of the provision of the positioning projection. However, the portion of the glass run corner part between the positioning projection and the glass run upper side part may expand or shrink due to temperature change, aging, etc., so that the glass run upper side part may be displaced with respect to the automotive door sash.

In view of the foregoing, it is desirable to provide a glass run which is prevented more effectively from being displaced with respect to an automotive door sash and thereby adversely affecting surroundings around the automotive door sash in terms of appearance.

According to one aspect of the present invention, a glass run comprises: a glass run upper side part provided with a core member inside the glass run upper side part, and formed with a longitudinal recess at a longitudinal end portion of the glass run upper side part, wherein the core member extends longitudinally of the glass run upper side part; a glass run lateral side part; a glass run corner part joining the glass run lateral side part to the longitudinal end portion of the glass run upper side part, and including an extension filling the longitudinal recess of the glass run upper side part; and a stopper part fixed to at least one of the glass run upper side part and the glass run corner part, and configured to engage with an automotive door sash, wherein the stopper part overlaps with the core member of the glass run upper side part and the extension of the glass run corner part longitudinally of the glass run upper side part. The glass run may be modified so that: the longitudinal recess of the glass run upper side part has a stepped shape including a surface extending longitudinally of the glass run upper side part; and the glass run upper side part is joined to the glass run corner part at least through the surface of the longitudinal recess. The glass run may be modified so that: the glass run upper side part includes a first side wall, a second side wall, and a bottom wall connecting the first side wall to the second side wall, wherein the first side wall, the second side wall, and the bottom wall extend longitudinally of the glass run upper side part; the first side wall is provided with the core member inside the first side wall; the second side wall is provided with a second core member inside the second side wall, wherein the second core member extends longitudinally of the glass run upper side part; the bottom wall includes a portion forming the longitudinal recess; and the stopper part is provided at the extension of the glass run corner part. The glass run may be modified so that: the glass run upper side part includes a first side wall, a second side wall, and a bottom wall connecting the first side wall to the second side wall, wherein the first side wall, the second side wall, and the bottom wall extend longitudinally of the glass run upper side part; the first side wall is provided with the core member inside the first side wall, wherein the first side wall includes a distal end portion farther from the bottom wall, wherein the core member is located between the distal end portion and the bottom wall, and wherein the distal end portion forms the longitudinal recess; the second side wall is provided with a second core member inside the second side wall, wherein the second core member extends longitudinally of the glass run upper side part; and the stopper part is provided at the bottom wall of the glass run upper side part. The glass run may be modified so that: the stopper part includes an insert member embedded in the extension of the glass run corner part; and the insert member is made of a harder material than the glass run corner part, and projects from the extension of the glass run corner part.

According to another aspect of the present invention, a glass run comprises: a glass run major part provided with a core member inside the glass run major part, and configured to be attached to a sash upper side part and a sash lateral side part of an automotive door sash, and formed with a longitudinal recess at a corner section of the glass run major part, wherein the sash upper side part extends in a vehicle body longitudinal direction, and the sash lateral side part extends in a vehicle body vertical direction, wherein the core member extends through the corner section longitudinally of the glass run major part; a glass run corner part filling the longitudinal recess of the glass run major part; and a stopper part provided at the glass run corner part, and configured to engage with the automotive door sash. The glass run may be modified so that: the glass run major part includes a first side wall, a second side wall, and a bottom wall connecting the first side wall to the second side wall, wherein the first side wall, the second side wall, and the bottom wall extend longitudinally of the glass run major part; the first side wall is provided with the core member inside the first side wall; the second side wall is provided with a second core member inside the second side wall, wherein the second core member extends longitudinally of the glass run major part; and the bottom wall includes a portion forming the longitudinal recess. The glass run may be modified so that: the stopper part includes an insert member embedded in the glass run corner part; and the insert member is made of a harder material than the glass run corner part, and projects from the glass run corner part.

According to a further aspect of the present invention, a glass run comprises: a glass run upper side part provided with a core member inside the glass run upper side part, wherein the core member extends longitudinally of the glass run upper side part; a glass run lateral side part; a glass run corner part joining the glass run lateral side part to a longitudinal end portion of the glass run upper side part; and a stopper part provided at the longitudinal end portion of the glass run upper side part, and configured to engage with an automotive door sash. The glass run may be modified so that: the glass run upper side part includes a first side wall, a second side wall, and a bottom wall connecting the first side wall to the second side wall, wherein the first side wall, the second side wall, and the bottom wall extend longitudinally of the glass run upper side part; the first side wall is provided with the core member inside the first side wall; the second side wall is provided with a second core member inside the second side wall, wherein the second core member extends longitudinally of the glass run upper side part; and the stopper part is provided at the bottom wall of the glass run upper side part. The glass run may be modified so that: the stopper part includes an insert member embedded in the glass run upper side part; and the insert member is made of a harder material than the glass run upper side part, and projects from the glass run upper side part.

According to a still further aspect of the present invention, a method for producing a glass run, comprises: forming a glass run upper side part by extrusion, wherein the glass run upper side part is provided with a core member inside the glass run upper side part, and formed with a longitudinal recess at a longitudinal end portion of the glass run upper side part, wherein the core member extends longitudinally of the glass run upper side part; forming a glass run lateral side part by extrusion; forming a glass run corner part by molding, wherein the glass run corner part joins the glass run lateral side part to the longitudinal end portion of the glass run upper side part, and includes an extension filling the longitudinal recess of the glass run upper side part; and forming a stopper part by molding simultaneously with the glass run corner part, wherein the stopper part is fixed to at least one of the glass run upper side part and the glass run corner part, and configured to engage with an automotive door sash, wherein the stopper part overlaps with the core member of the glass run upper side part and the extension of the glass run corner part longitudinally of the glass run upper side part.

DETAILED DESCRIPTION OF THE INVENTION

Figure 1:
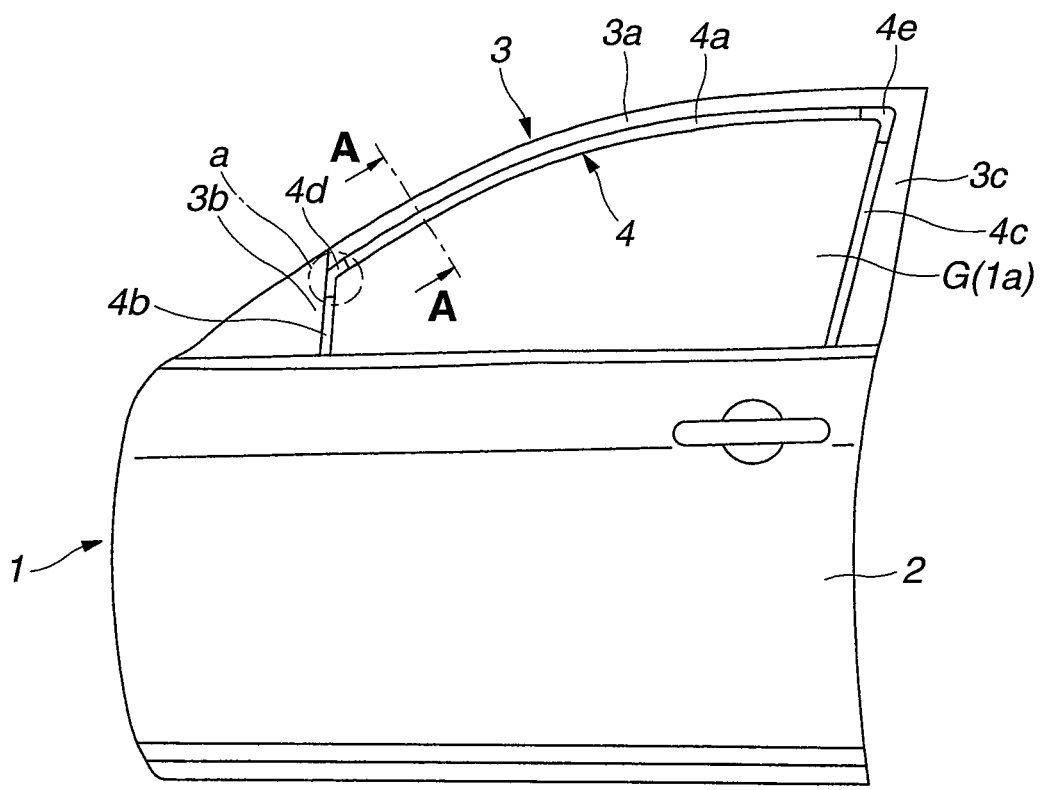
FIG. 1 is a diagram showing an automotive front door provided with a glass run according to a first embodiment of the present invention.
Figure 2:
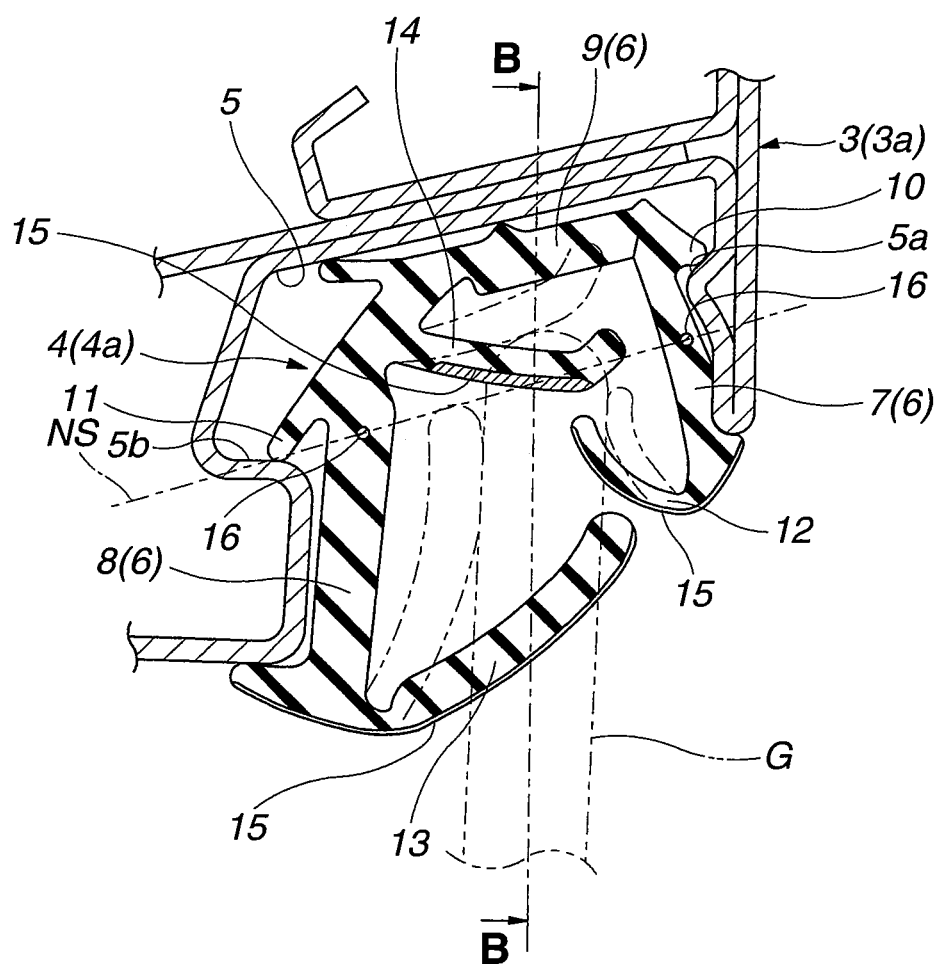
FIG. 2 is a sectional view taken along a line A-A in FIG. 1.
Figure 3:
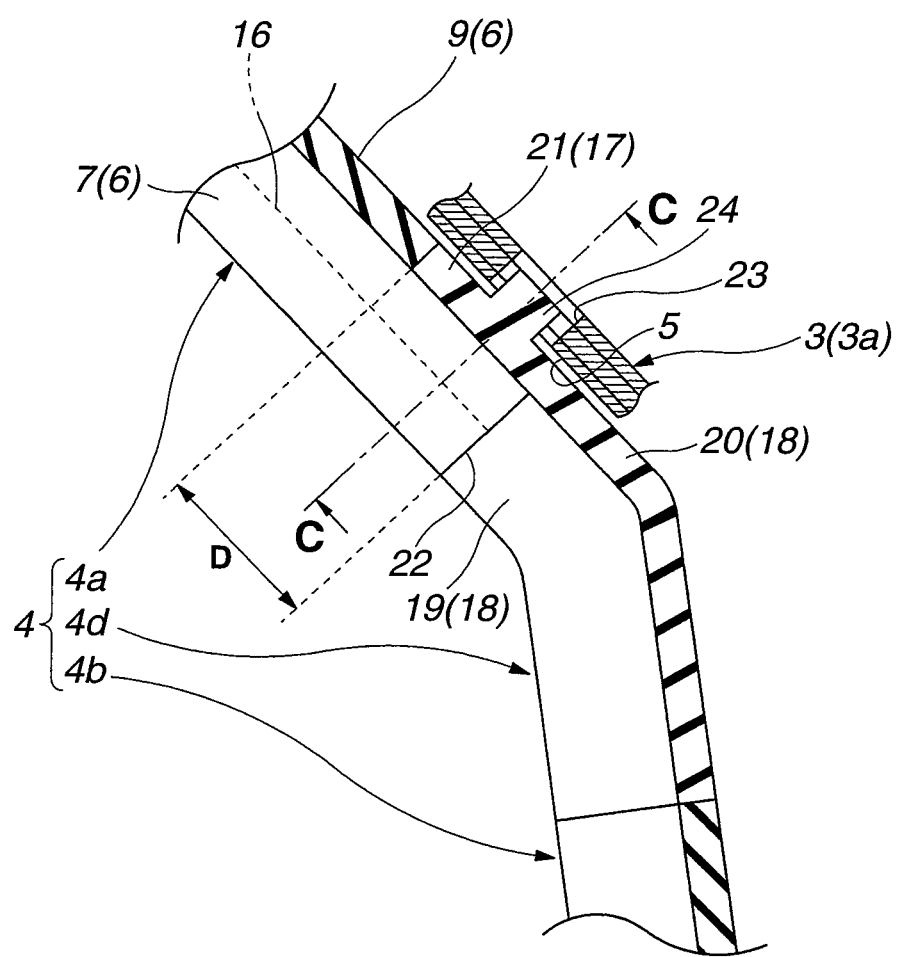
FIG. 3 is a sectional view taken along a line B-B in FIG. 2.
Figure 4:
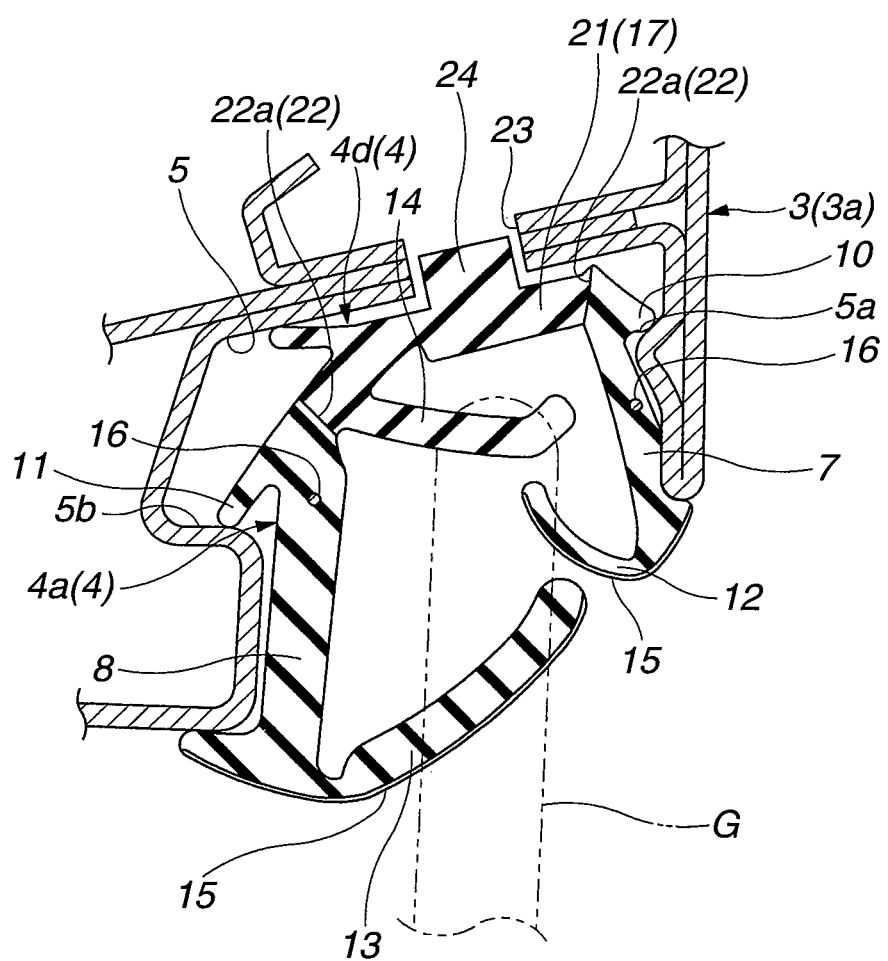
FIG. 4 is a sectional view taken along a line C-C in FIG. 3.

FIGS. 1 to 4 show a first embodiment of the present invention. FIG. 1 shows an automotive front door provided with a glass run according to the first embodiment. FIG. 2 shows a sectional view taken along a line A-A in FIG. 1. FIG. 3 is a sectional view of the glass run taken along a line B-B in FIG. 2, showing neighborhood of a front glass run corner part 4d (circled as "a" in FIG. 1). In FIG. 3, seal lips 12, 13 and 14 are omitted. FIG. 4 is a sectional view of the glass run taken along a line C-C in FIG. 3.

As shown in FIG. 1, an automotive front door 1 includes a door body 2 and a door sash 3, between which a window opening is formed. The door sash 3 has an arch shape as viewed in a vehicle lateral direction, as shown in FIG. 1. The window opening is opened or closed with a door glass "G" which slides upward and downward under drive of a window regulator (not shown) housed in the door body 2. A glass run 4 is attached to an inside periphery of the door sash 3. The glass run 4 guides the upward or downward sliding motion of the door glass G, and seals the boundary between the door glass G and the door sash 3.

The glass run 4 includes a glass run upper side part 4a, a front glass run lateral side part 4b, a rear glass run lateral side part 4c, a front glass run corner part 4d, and a rear glass run corner part 4e. The glass run upper side part 4a is attached to a sash upper side part 3a of the door sash 3 which extends in a vehicle longitudinal direction. The front and rear glass run lateral side parts 4b, 4c are attached to front and rear sash lateral side parts 3b, 3c, respectively, each of which extends in a vehicle vertical direction. The front and rear glass run corner parts 4d, 4e are substantially L-shaped as viewed in the vehicle lateral direction, and join the front and rear glass run lateral side parts 4b, 4c to front and rear longitudinal ends of the glass run upper side part 4a, respectively. The glass run upper side part 4a ascends as followed rearward in the vehicle longitudinal direction, in conformance with the shape of a vehicle body to which the front door 1 is attached. Each part of the glass run 4 is made of rubber such as EPDM (Ethylene Propylene Diene Monomer), or made of resin such as a thermoplastic elastomer such as TPO (Thermoplastic Olefin).

As shown in FIG. 2, each of the glass run upper side part 4a and front and rear glass run lateral side parts 4b, 4c is formed by extrusion to have a channel-shaped cross-section that is slightly different from each other. These parts are joined together by the front and rear glass run corner parts 4d, 4e which are molded to have a channel-shaped cross-section. In this way, the glass run 4 is formed as a continuous long channel.

As shown in FIG. 2, the glass run upper side part 4a includes a glass run body 6 that has a channel-shaped cross-section. The glass run body 6 is fitted to a channel 5 of the door sash 3 that is formed by roll forming. The glass run body 6 is formed with a plurality of retaining lips 10, 11 at the outside surface of the glass run body 6. Each retaining lip 10, 11 projects from the outside surface of the glass run body 6, and engages with a step 5a, 5b of the door sash 3 in elastic contact with the step 5a, 5b, so that the glass run upper side part 4a is prevented from dropping from the door sash 3.

As shown in FIG. 2, the glass run body 6 has an outer side wall 7, an inner side wall 8, and a bottom wall 9 connecting the side walls 7, 8 to each other. The side wall 7 has an outer seal lip 12 at its tip or distal end, whereas the side wall 8 has an inner seal lip 13 at its tip or distal end. The outer seal lip 12 and inner seal lip 13 project diagonally into the space surrounded by the channel shape of the glass run body 6. When the window opening is closed by the door glass G, the channel shape of the glass run body 6 receives or accommodates the door glass G in a manner that the outer seal lip 12 and the inner seal lip 13 are pressed into elastic contact with the front and back surfaces of the door glass G, as indicated by imaginary lines in FIG. 2. This serves to seal the boundary between the inside and outside of an automotive vehicle. The glass run 4 further includes a bottom lip 14 which projects from an inside corner of the bottom wall 9 of the glass run body 6. The bottom lip 14 receives the upper edge of the door glass G, when the door glass G is accommodated in the glass run body 6. The glass run upper side part 4a is formed with a sliding contact layer 15 at places in contact with the door glass G, i.e. at the outer seal lip 12, the inner seal lip 13, and the bottom lip 14. Similar to the glass run upper side part 4a, the front and rear glass run lateral side parts 4b, 4c and the front and rear glass run corner parts 4d, 4e are formed with an outer seal lip 12 and an inner seal lip 13.

Each side wall 7, 8 is provided with a core member 16 inside the side wall 7, 8, wherein the core member 16 extends longitudinally of the side wall 7, 8. The core member 16 is a linear member, which is a wire made of metal such as brass in this example. The core member 16 serves to prevent expansion and shrinkage of the glass run upper side part 4a. The core member 16 has a circular cross-section in this example. During formation of the glass run upper side part 4a, the core member 16 is coated with an adhesive, and then passed to a mouthpiece of a pressing machine that is used to form the glass run upper side part 4a by extrusion, so that the core member 16 is embedded in and integrated with the side wall 7, 8 in a manner of simultaneous extrusion. The core member 16 may be made of nonmetal such as resin, if the core member 16 can maintain the function of preventing the expansion and shrinkage of the glass run upper side part 4a.

The position of the core member 16 in the glass run upper side part 4a is set on a neutral plane of bending "NS" as shown in FIG. 2, in consideration that the glass run upper side part 4a is bended and fitted to the curved sash upper side part 3a. The neutral plane NS is a plane on which no extension and contraction occurs when the glass run upper side part 4a is bended in conformance with the shape of the sash upper side part 3a.

As shown in FIGS. 3 and 4, a longitudinal end portion of the glass run upper side part 4a in the vehicle longitudinal direction is formed with a stepped cutout or longitudinal recess 17 at the bottom wall 9 of the glass run body 6. In this way, the portion of the glass run upper side part 4a where the core member 16 is embedded projects toward the front glass run corner part 4d with respect to the remaining portion of the glass run upper side part 4a longitudinally of the glass run upper side part 4a. Namely, the side walls 7, 8 project toward the front glass run corner part 4d with respect to the bottom wall 9 longitudinally of the glass run upper side part 4a.

On the other hand, an end portion of the front glass run corner part 4d closer to the glass run upper side part 4a includes a glass run body 18. The glass run body 18 has substantially the same cross-section as the glass run body 6 of the glass run upper side part 4a. The glass run body 18 includes a bottom wall 20 and side walls 19, 19, wherein the bottom wall 20 is extended toward the glass run upper side part 4a with respect to the side walls 19.

Specifically, the front glass run corner part 4d is formed by setting the glass run upper side part 4a and the front glass run lateral side part 4b, which are formed proactively, in a manner that one end portion of the glass run upper side part 4a and one end portion of the front glass run lateral side part 4b are inserted in a mold not shown with a space therebetween, and infusing a resin material or rubber material to the space. This molding formation of the front glass run corner part 4d achieves a construction that the front glass run corner part 4d is formed with an extension 21 filling the cutout 17 of the glass run upper side part 4a, and the glass run upper side part 4a is joined to the front glass run corner part 4d through a stepped junction surface 22 including longitudinal surfaces 22a that extend longitudinally of the glass run upper side part 4a.

The extension 21 of the front glass run corner part 4d is formed with a positioning projection 24 projecting outwardly from the bottom portion of the front glass run corner part 4d. The positioning projection 24 has a rectangular cross-section as shown in FIG. 4, and adapted to be fitted to and engaged with a positioning hole 23 of the door sash 3. The engagement between the positioning projection 24 and the positioning hole 23 serves to position the front glass run corner part 4d longitudinally of the glass run upper side part 4a, i.e. in the vehicle longitudinal direction. Namely, the positioning projection 24 is located in a section "D" in the longitudinal direction of the glass run upper side part 4a, in which the extension 21 of the front glass run corner part 4d extends. In this construction, the positioning projection 24 serves as a stopper portion to restrict displacement of the front glass run corner part 4d toward the glass run upper side part 4a. The positioning projection 24 is not limited to the above position within the section D, but may be positioned so that at least part of the positioning projection 24 overlaps with the section D.

The following describes advantageous effects produced by the glass run described above. When the window opening 1a is closed by the door glass G, a closing force acts on the glass run upper side part 4a rearward in the vehicle longitudinal direction, because the glass run upper side part 4a is inclined to ascend as followed rearward in the vehicle longitudinal direction as described above. The provision of the positioning projection 24 serves to prevent displacement of the glass run upper side part 4a due to the closing force of the door glass G. Furthermore, the feature that the core member 16 embedded in the glass run upper side part 4a extends longitudinally of the glass run upper side part 4a or in the vehicle longitudinal direction up to the position where the positioning projection 24 is provided, serves to prevent expansion and shrinkage of the glass run upper side part 4a, and further prevent expansion and shrinkage of the extension 21 of the front glass run corner part 4d, and thereby effectively prevent displacement of the glass run upper side part 4a in the vehicle longitudinal direction. This serves to prevent the surroundings around the door sash 3 from adversely affected in terms of appearance.

The feature that the junction surface 22 between the glass run upper side part 4a and the front glass run corner part 4d has a stepped shape with the longitudinal surfaces 22a, serves to increase the area through which the glass run upper side part 4a and the front glass run corner part 4d are joined. Moreover, this junction is advantageous, because when the glass run upper side part 4a is subject to a stretching force by the closing of the door glass G, the stretching force is received by the longitudinal surfaces 22a in the form of shear stresses.

This feature serves to enhance the strength of junction between the glass run upper side part 4a and the front glass run corner part 4d.

In general, the front glass run corner part 4d can have a different texture than those of the glass run upper side part 4a and the front and rear glass run lateral side parts 4b, 4c, because the front glass run corner part 4d is formed by molding, whereas the glass run upper side part 4a and the front and rear glass run lateral side parts 4b, 4c are formed by extrusion. The feature that the extension 21 of the front glass run corner part 4d is formed at the bottom wall 20 that is not exposed when the glass run 4 is attached to the door sash 3, serves to enhance the appearance of the surroundings of the door sash 3 because the front glass run corner part 4d appears compact and indistinctive.

Figure 5:
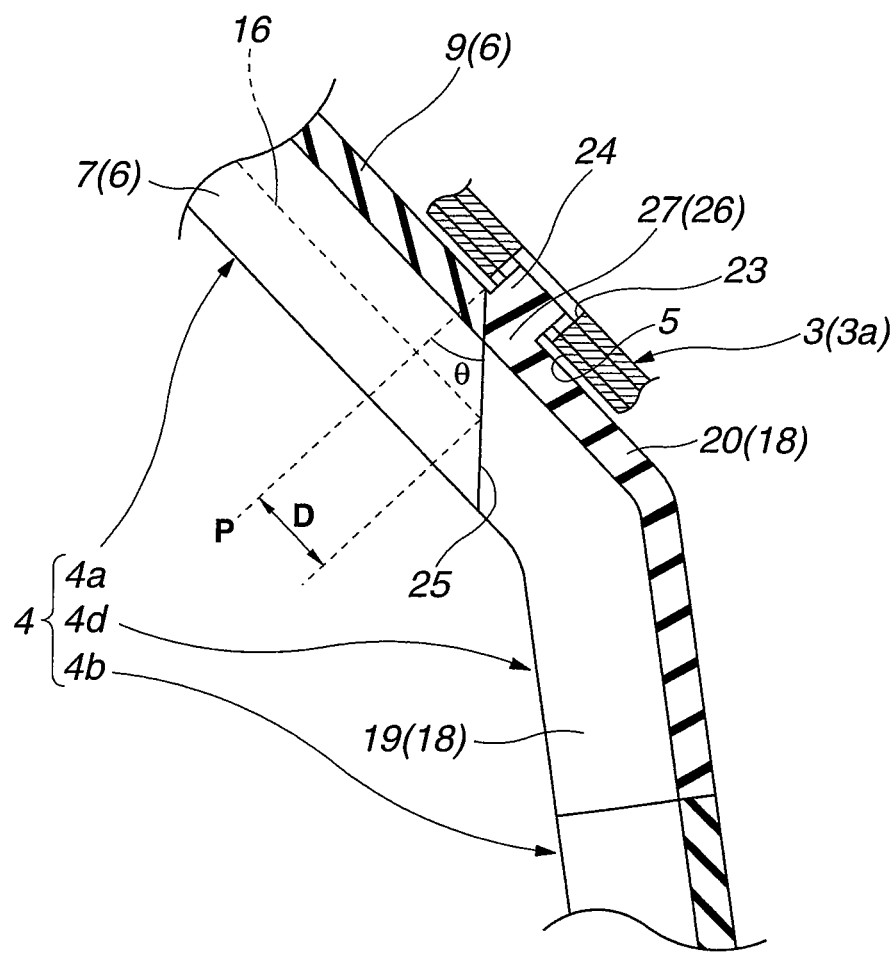
FIG. 5 is a partial sectional view of an automotive front door provided with a glass run according to a first modification of the first embodiment, similar to FIG. 3.

The longitudinal end portion of the glass run upper side part 4a joined to the front glass run corner part 4d is not limited to a stepped shape, but may be modified if the portion of the glass run upper side part 4a where the core member 16 is embedded projects toward the front glass run corner part 4d with respect to the other portion. FIG. 5 shows a partial sectional view of an automotive front door provided with a glass run according to a first modification of the first embodiment, similar to FIG. 3. In this modification, the longitudinal end portion of the glass run upper side part 4a has an inclined end surface as a junction surface 25 joined to the front glass run corner part 4d. The junction surface 25 has a specific angle θ with respect to an imaginary plane P perpendicular to the longitudinal direction of the glass run upper side part 4a. Accordingly, the portion of side wall 7, 8 where the core member 16 is embedded projects toward the front glass run corner part 4d with respect to the bottom wall 9. The other part of the glass run 4 is the same as in the first embodiment. The positioning projection 24 is provided at the section D where an extension 27 of the front glass run corner part 4d extends.

The glass run described above produces similar advantageous effects as in the first embodiment. Namely, the feature that the core member 16 embedded in the glass run upper side part 4a extends longitudinally of the glass run upper side part 4a or in the vehicle longitudinal direction up to the position where the positioning projection 24 is provided, serves to prevent expansion and shrinkage of the glass run upper side part 4a, and further prevent expansion and shrinkage of the extension 27 of the front glass run corner part 4d, and thereby effectively prevent displacement of the glass run upper side part 4a in the vehicle longitudinal direction.

Figure 6:
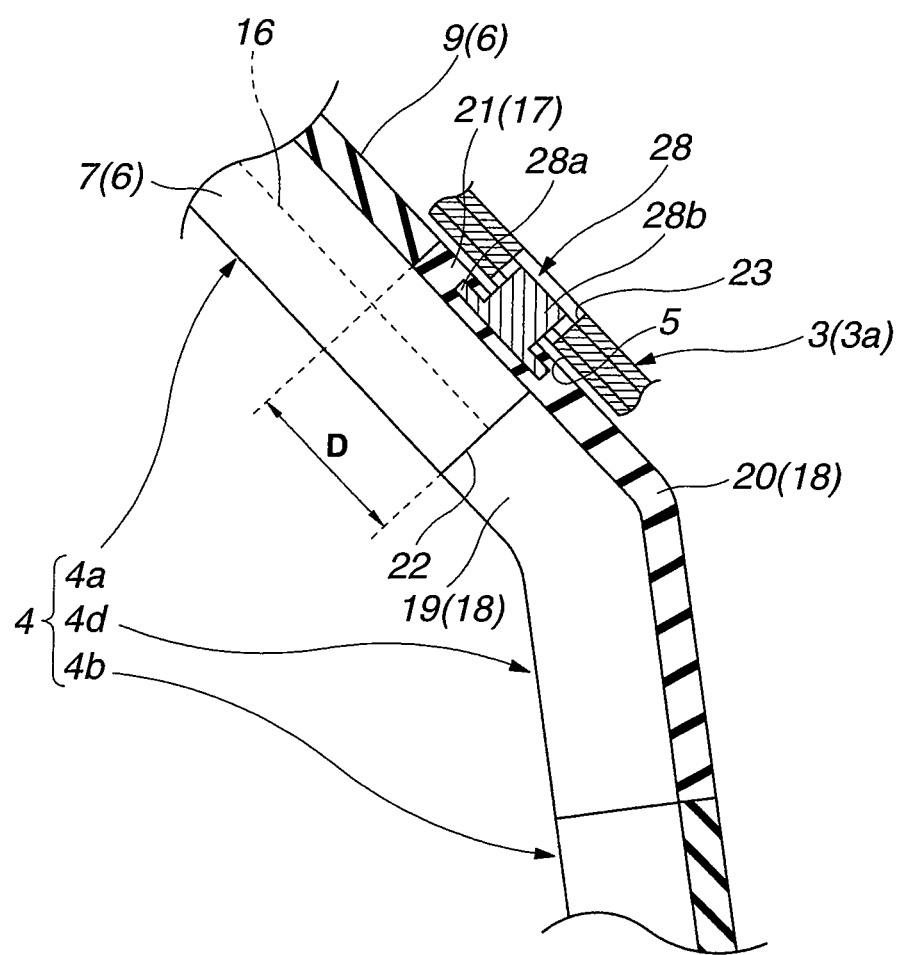
FIG. 6 is a partial sectional view of an automotive front door provided with a glass run according to a second modification of the first embodiment, similar to FIG. 3.

The feature according to the first embodiment that the positioning projection 24 is formed of rubber or resin integrally with the front glass run corner part 4d may be modified as shown in FIG. 6 in which the positioning projection 24 is replaced with a positioning projection 28b that is made of a harder material than the front glass run corner part 4d, for enhancing the effect of preventing the displacement of the front glass run corner part 4d. FIG. 6 shows a partial sectional view of an automotive front door provided with a glass run according to a second modification of the first embodiment, similar to FIG. 3. In this modification, an insert member 28 is made of metal and embedded in the extension 21 of the front glass run corner part 4d. The insert member 28 includes a base portion 28a and a positioning projection 28b. The base portion 28a is a plate embedded in the extension 21. The positioning projection 28b projects from the base portion 28a at the bottom surface of the extension 21 and serves as a stopper part. The positioning projection 28b is adapted to be fitted to and engaged with the positioning hole 23 of the door sash 3. The insert member 28 is not limited to metal, but may be made of another harder material, such as harder resin, than the front glass run corner part 4d. The other part of the glass run 4 is the same as in the first embodiment.

The glass run described above produces similar advantageous effects as in the first embodiment. Furthermore, the harder positioning projection 28b serves to prevent more effectively displacement of the front glass run corner part 4d by engagement with the door sash 3.

Figure 7:
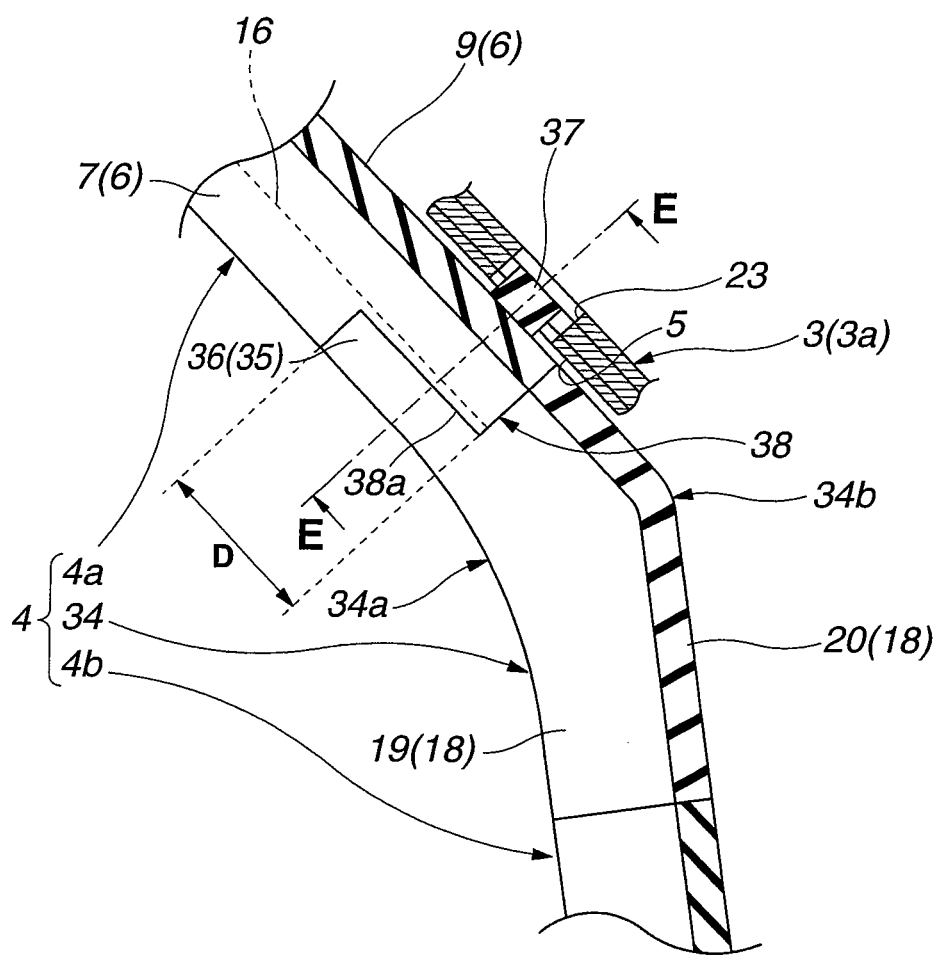
FIG. 7 is a partial sectional view of an automotive front door provided with a glass run according to a second embodiment of the present invention, similar to FIG. 3.
Figure 8:
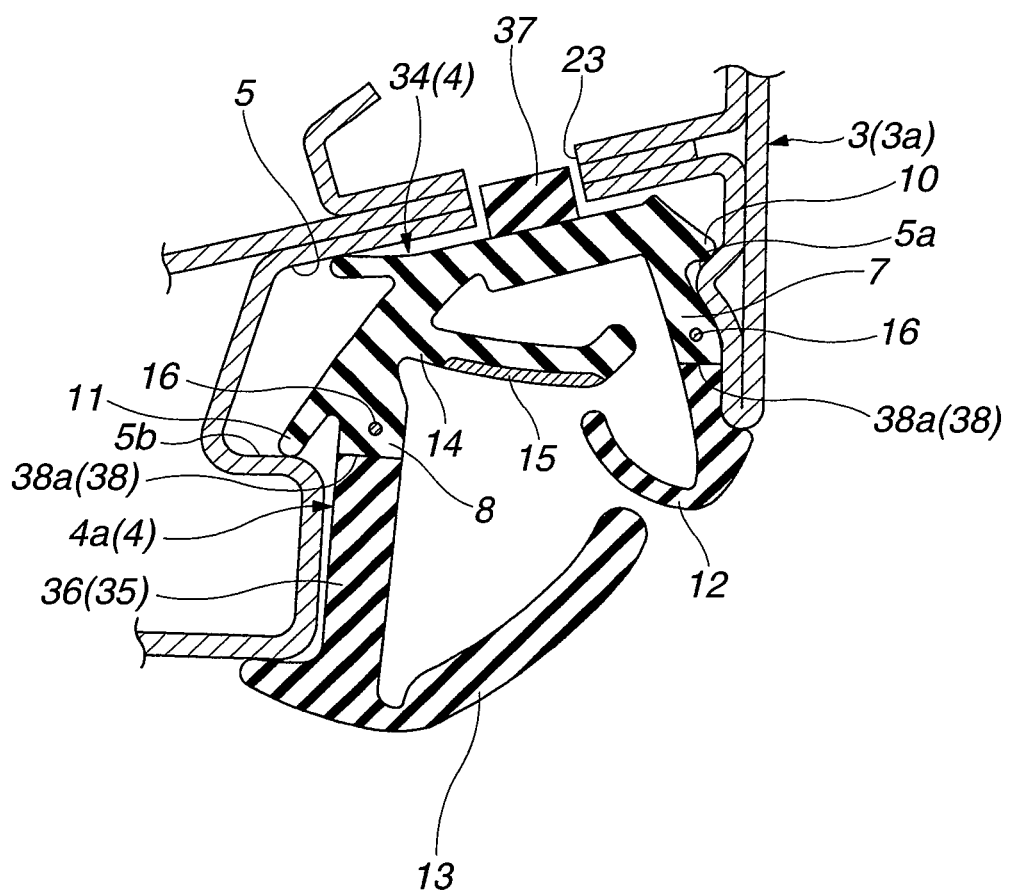
FIG. 8 is a sectional view taken along a line E-E in FIG. 7.

FIGS. 7 and 8 show a second embodiment of the present invention. FIG. 7 shows a partial sectional view of an automotive front door provided with a glass run according to the second embodiment, similar to FIG. 3. FIG. 8 is a sectional view taken along a line E-E in FIG. 7. The components common between the first embodiment and the second embodiment are given the same reference characters and description thereof is omitted.

In FIG. 7, a glass run corner part 34 has an inside round portion 34a (at the tip side of the side wall 7, 8) and an outside round portion 34b (at the root side of the side wall 7, 8, or at the bottom wall 9), wherein the inside round portion 34a has a larger radius of curvature than the outside round portion 34b as viewed in FIG. 7. The inside round portion 34a extends and projects more deeply toward the inside round portion 34a than the outside round portion 34b. The longitudinal end portion of the glass run upper side part 4a closer to the glass run corner part 34 has a cutout or longitudinal recess 35 at the tip portion of the side wall 7, 8, wherein the core member 16 is located between the tip portion and the bottom wall 9, and wherein the cutout 35 is filled with an extension 36 of the glass run corner part 34. Accordingly, the glass run upper side part 4a is joined to the glass run corner part 34 through a junction surface 38 that includes longitudinal surfaces 38a, 38a extending in the longitudinal direction of the glass run upper side part 4a.

In this way, along the longitudinal direction of the glass run upper side part 4a, in the section D where the extension 36 is formed, the inside portion (the tip of the side wall 7, 8) where the cross-section varies as followed longitudinally of the glass run upper side part 4a is formed by molding, whereas the outside portion (at the root of the side wall 7, 8, or at the bottom wall 9) where the cross-section is constant as followed longitudinally of the glass run upper side part 4a is formed by extrusion. This feature allows to form the glass run corner part 34 further compact.

Moreover, in the section D where the extension 36 extends, the glass run upper side part 4a is provided with a positioning projection 37 as a stopper part which has a rectangular cross-section, and projects from the bottom wall 9, and engages with the positioning hole 23 of the door sash 3. The engagement between the positioning projection 37 and the positioning hole 23 serves to position the glass run corner part 34 longitudinally of the glass run upper side part 4a, i.e. in the vehicle longitudinal direction. The positioning projection 37 is formed simultaneously with the glass run corner part 34 by being formed from the same material with the mold that forms both of the glass run corner part 34 and the positioning projection 37.

The glass run described above produces similar advantageous effects as in the first embodiment. Furthermore, the feature that the positioning projection 37 is formed directly on the glass run upper side part 4a in which the core member 16 is embedded, serves to effectively prevent displacement of the glass run upper side part 4a in the vehicle longitudinal direction. The compact forming of the glass run corner part 34, which can be made even if the inside round portion 34a extends long toward the glass run upper side part 4a than the outside round portion 34b, serves to stabilize the shape of the glass run corner part 34, and enhance the appearance of the surroundings of the door sash 3.

In the constructions shown in FIGS. 1 to 8, each side wall 7, 8 of the glass run upper side part 4a is provided with the core member 16, where the core member 16 extends up to the position in the longitudinal direction of the glass run upper side part 4a where the positioning projection 24, 28b, 37 is formed. This may be modified so that only one of the core members 16 extends up to that position. Namely, one of the core members 16 may be cut out from the glass run upper side part 4a to form a longitudinal recess that is filled by the extension of the front glass run corner part 4d.

Furthermore, the core member 16 may be embedded in the bottom wall 9 or parts other than the side walls 7, 8. One of the core members 16 of the side walls 7, 8 may be eliminated so that only one of the side walls 7, 8 is provided with the core member 16 and the other is provided with no core member 16.

Figure 9:
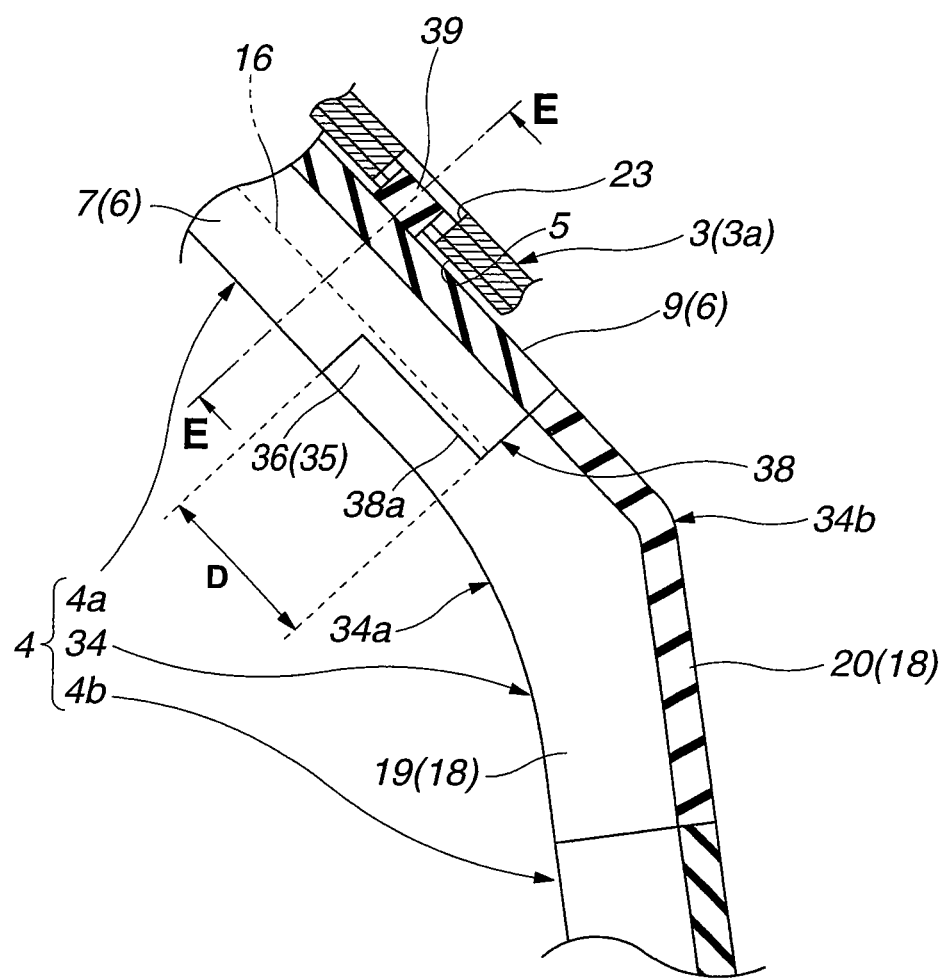
FIG. 9 is a partial sectional view of an automotive front door provided with a glass run according to a third embodiment of the present invention, similar to FIG. 7.
Figure 10:
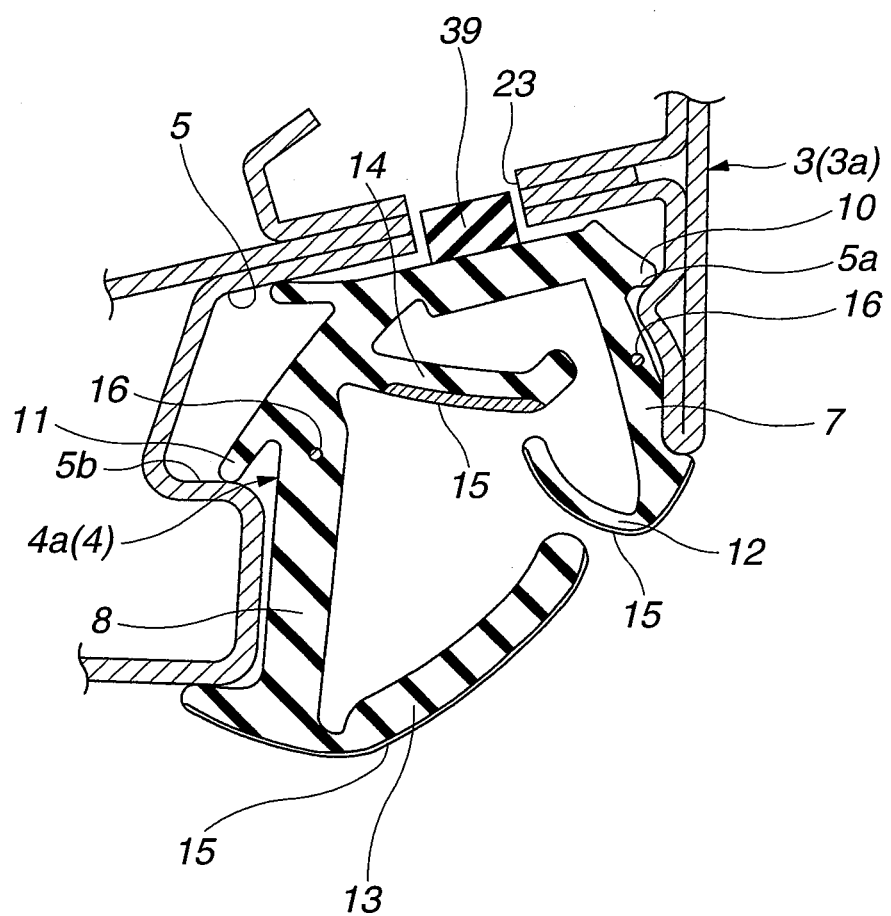
FIG. 10 is a sectional view taken along a line E-E in FIG. 9.

FIGS. 9 and 10 show a third embodiment of the present invention. FIG. 9 shows a partial sectional view of an automotive front door provided with a glass run according to the third embodiment, similar to FIG. 7. FIG. 10 is a sectional view taken along a line E-E in FIG. 9. The components common between the second embodiment and the third embodiment are given the same reference characters and description thereof is omitted.

The third embodiment is based on the second embodiment, and modified so that the positioning projection 37 is replaced with a positioning projection 39 that is positioned farther from the front glass run corner part 4d and out of the section D where the extension 36 is formed. Namely, the glass run upper side part 4a is provided with the positioning projection 39 at the longitudinal end portion connected to the glass run corner part 34, wherein the positioning projection 39 is positioned at a point in the longitudinal direction of the glass run upper side part 4a where a glass run body 18 is constituted only by the glass run upper side part 4a (not by the glass run corner part 34). The positioning projection 39 is formed simultaneously with the glass run corner part 34 by being formed from the same material with the same mold, as the positioning projection 37 in the second embodiment.

The glass run described above produces similar advantageous effects as in the second embodiment. Furthermore, the feature that the glass run upper side part 4a is formed with the positioning projection 39 out of the front glass run corner part 4d longitudinally of the glass run upper side part 4a, serves to effectively prevent the displacement of the glass run upper side part 4a in the vehicle longitudinal direction.

Figure 11:
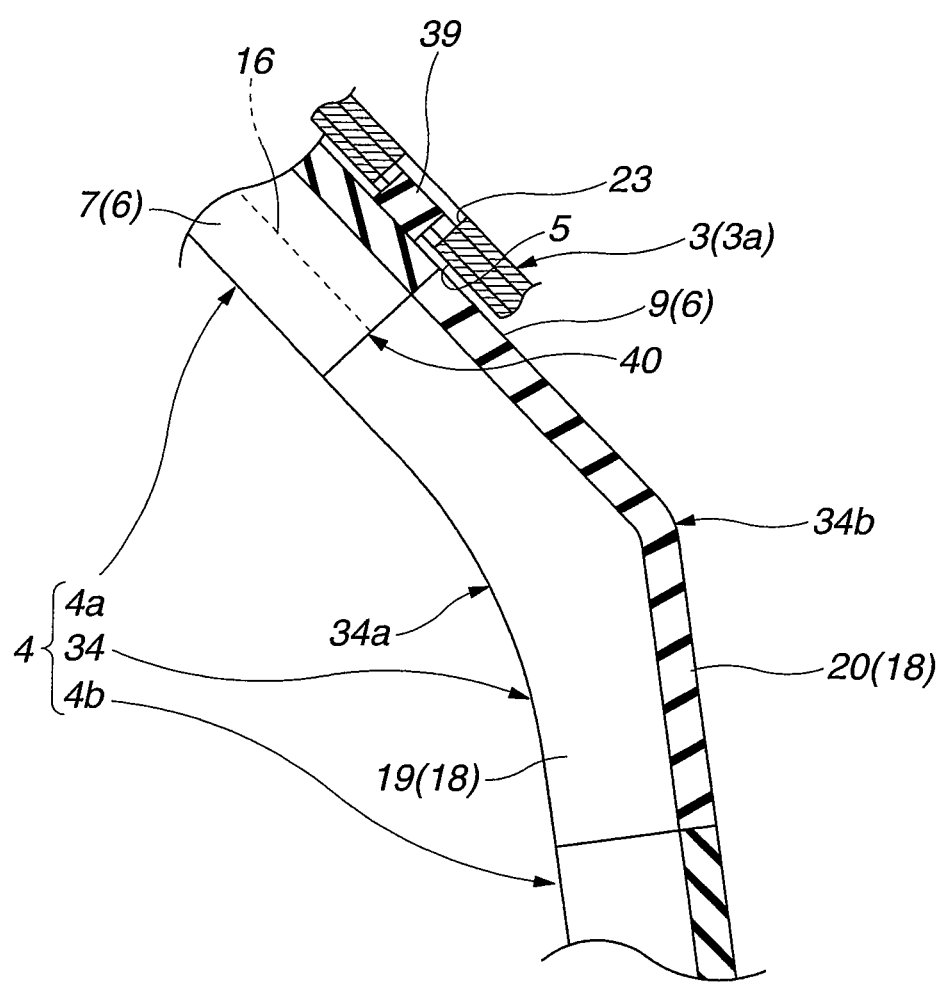
FIG. 11 is a partial sectional view of an automotive front door provided with a glass run according to a modification of the third embodiment, similar to FIG. 9.

The shape of the longitudinal end portion of the glass run upper side part 4a connected to the glass run corner part 34 may be modified, because the feature that the glass run upper side part 4a is formed with the positioning projection 39 out of the front glass run corner part 4d longitudinally of the glass run upper side part 4a, still produces the advantageous effects. FIG. 11 shows a partial sectional view of an automotive front door provided with a glass run according to a modification of the third embodiment, similar to FIG. 9. As shown in FIG. 11, the longitudinal end portion of the glass run upper side part 4a has a flat surface without a step as shown in the third embodiment of FIG. 9. In this modification, the glass run upper side part 4a is joined to the glass run corner part 34 thorough a junction surface 40 that is flat and perpendicular to the longitudinal direction of the glass run upper side part 4a. The glass run described above produces similar advantageous effects as in the third embodiment.

Figure 12:
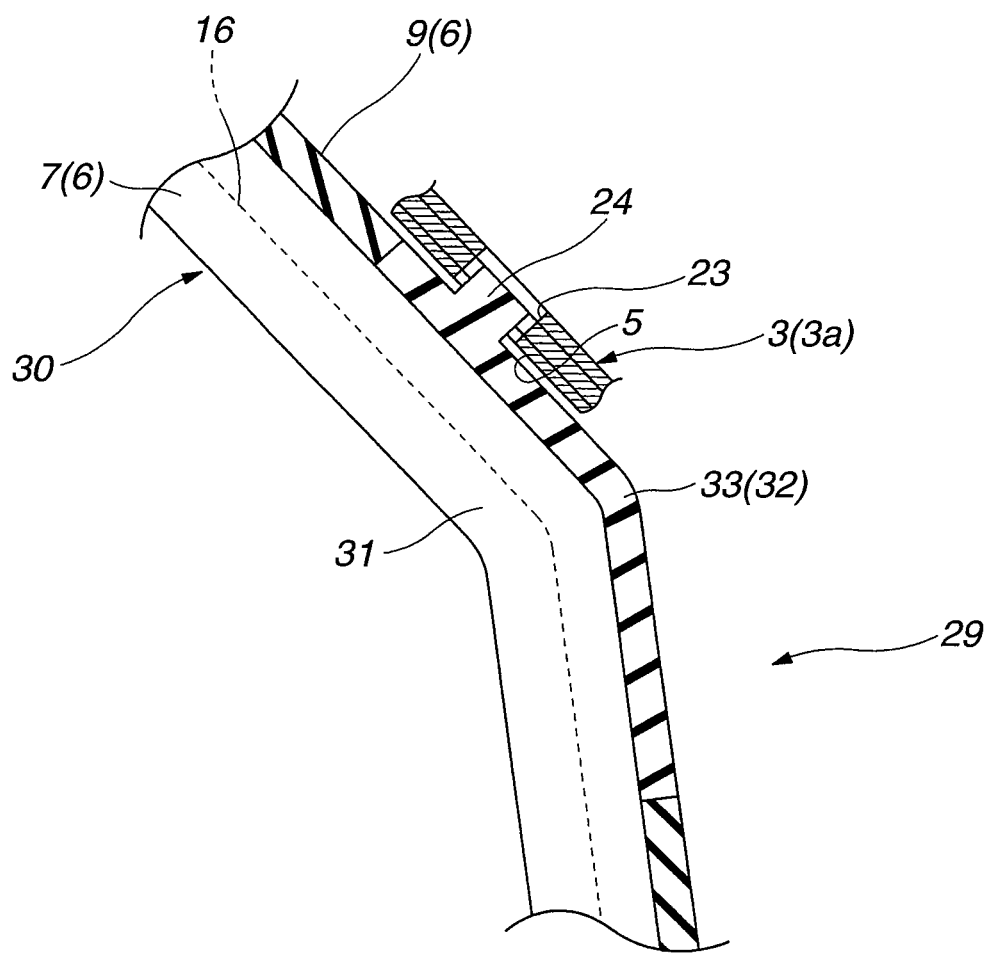
FIG. 12 is a partial sectional view of an automotive front door provided with a glass run according to a fourth embodiment of the present invention, similar to FIG. 3.

FIG. 12 shows a side-sectional view of an automotive front door provided with a glass run according to a fourth embodiment of the present invention, similar to FIG. 3. The components common between the first embodiment and the second embodiment are given the same reference characters and description thereof is omitted.

In the fourth embodiment, a glass run 29 includes a glass run major part 30, which is formed by extrusion to have a similar channel-shaped cross-section as the glass run upper side part 4a in the first embodiment shown in FIG. 2, and adapted to be attached to both of the sash upper side part 3a and the front sash lateral side part 3b of the door sash 3. The glass run major part 30 is formed with a cutout or longitudinal recess 32 which is filled by a glass run corner part 33.

The glass run major part 30 includes a channel-shaped glass run body 6. The core members 16 are embedded in the side walls 7, 8 of the glass run body 6, respectively. The glass run 29 is formed by setting the glass run major part 30, which is formed with the cutout 32 proactively, in a mold not shown, and infusing a resin material or rubber material into the mold, thereby forming the glass run corner part 33 with the positioning projection 24. In this way, the portion of the glass run major part 30 where the core members 16 are embedded, namely, the side walls 7, 8 of the glass run major part 30 extend over the entire glass run major part 30 with no cutout or longitudinal recess, so that the corner section 31 has a similar cross-section as in the first embodiment shown in FIG. 4.

The glass run described above produces similar advantageous effects as in the second embodiment. Furthermore, the feature that the core members 16 extend through the glass run major part 30 over the entire length of the glass run major part 30, serves to effectively prevent displacement of the glass run 29 in the vehicle longitudinal direction due to expansion and shrinkage of the glass run corner part 33.

Moreover, the feature that the glass run corner part 33 is formed to fill the cutout 32 of the bottom wall 9 of the glass run major part 30 that is not exposed when the glass run major part 30 is attached to the door sash 3, serves to prevent the glass run corner part 33 from being exposed when attached to the door sash 3, and thereby improve the appearance of the surroundings of the door sash 3.

The present embodiments are applied to a glass run attached to an automotive front door, but may be applied to a glass run attached to an automotive rear door without substantial modification.

The entire contents of Japanese Patent Application 2010-258105 filed Nov. 18, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A glass run comprising:
a glass run upper side part provided with a core member inside the glass run upper side part, and formed with a longitudinal recess at a longitudinal end portion of the glass run upper side part, wherein the core member extends longitudinally of the glass run upper side part and is a metal wire completely encased by the glass run upper side part, wherein the glass run upper side part is configured to be attached to a sash upper side part of an automotive door sash, and wherein the major axis of the sash upper side part extends substantially in a vehicle body longitudinal direction, and comprises a portion that ascends in a vehicle body vertical direction rearward in the vehicle body longitudinal direction;

a glass run lateral side part configured to be attached to a sash lateral side part of the automotive door sash, wherein the sash lateral side part extends substantially in the vehicle body vertical direction, and wherein the sash upper side part is above the sash lateral side part in the vehicle body vertical direction;

a glass run corner part joining the glass run lateral side part to the longitudinal end portion of the glass run upper side part, and including an extension filling the longitudinal recess of the glass run upper side part; and a stopper part fixed to at least one of the glass run upper side part or the glass run corner part, and configured to project from the at least one of the glass run upper side part or the glass run corner part toward the automotive door sash and engage with the automotive door sash, wherein the stopper part overlaps with the core member of the glass run upper side part and the extension of the glass run corner part longitudinally of the glass run upper side part.

2. The glass run as claimed in claim 1, wherein:

the longitudinal recess of the glass run upper side part has a stepped shape including a surface extending longitudinally of the glass run upper side part; and the glass run upper side part is joined to the glass run corner part at least through the surface of the longitudinal recess.

3. The glass run as claimed in claim 1, wherein:

the glass run upper side part includes a first side wall, a second side wall, and a bottom wall connecting the first side wall to the second side wall, wherein the first side wall, the second side wall, and the bottom wall extend longitudinally of the glass run upper side part;

the first side wall is provided with the core member inside the first side wall;

the second side wall is provided with a second core member inside the second side wall, wherein the second core member extends longitudinally of the glass run upper side part;

the bottom wall includes a portion forming the longitudinal recess; and the stopper part is provided at the extension of the glass run corner part.

4. The glass run as claimed in claim 2, wherein:

the glass run upper side part includes a first side wall, a second side wall, and a bottom wall connecting the first side wall to the second side wall, wherein the first side wall, the second side wall, and the bottom wall extend longitudinally of the glass run upper side part;

the first side wall is provided with the core member inside the first side wall;

the second side wall is provided with a second core member inside the second side wall, wherein the second core member extends longitudinally of the glass run upper side part;

the bottom wall includes a portion forming the longitudinal recess; and the stopper part is provided at the extension of the glass run corner part.

5. The glass run as claimed in claim 1, wherein:

the glass run upper side part includes a first side wall, a second side wall, and a bottom wall connecting the first side wall to the second side wall, wherein the first side wall, the second side wall, and the bottom wall extend longitudinally of the glass run upper side part;

the first side wall is provided with the core member inside the first side wall, wherein the first side wall includes a distal end portion farther from the bottom wall, wherein the core member is located between the distal end portion and the bottom wall, and wherein the distal end portion forms the longitudinal recess;

the second side wall is provided with a second core member inside the second side wall, wherein the second core member extends longitudinally of the glass run upper side part; and the stopper part is provided at the bottom wall of the glass run upper side part.

6. The glass run as claimed in claim 2, wherein:

the glass run upper side part includes a first side wall, a second side wall, and a bottom wall connecting the first side wall to the second side wall, wherein the first side wall, the second side wall, and the bottom wall extend longitudinally of the glass run upper side part;

the first side wall is provided with the core member inside the first side wall, wherein the first side wall includes a distal end portion farther from the bottom wall, wherein the core member is located between the distal end portion and the bottom wall, and wherein the distal end portion forms the longitudinal recess;

the second side wall is provided with a second core member inside the second side wall, wherein the second core member extends longitudinally of the glass run upper side part; and the stopper part is provided at the bottom wall of the glass run upper side part.

7. The glass run as claimed in claim 1, wherein:

the stopper part includes an insert member embedded in the extension of the glass run corner part; and the insert member is made of a harder material than the glass run corner part, and projects from the extension of the glass run corner part.

* * * * *